(No Model.)

J. McCALLUM.
WAGON RUNNING GEAR.

No. 553,290.        Patented Jan. 21, 1896.

Witnesses
Walter Wagner
Kirk G. Dutton

Inventor
James McCallum
By his Attorney
Wm Zimmerman

UNITED STATES PATENT OFFICE.

JAMES McCALLUM, OF AURORA, ILLINOIS.

WAGON RUNNING-GEAR.

SPECIFICATION forming part of Letters Patent No. 553,290, dated January 21, 1896.

Application filed November 30, 1894. Serial No. 530,384. (No model.)

*To all whom it may concern:*

Be it known that I, JAMES MCCALLUM, a citizen of the United States, residing at Aurora, in the county of Kane and State of Illinois, have invented certain new and useful Improvements in Wagons, which are fully set forth in the following specification, reference being had to the accompanying drawings, forming a part hereof, and in which—

Figure 1:
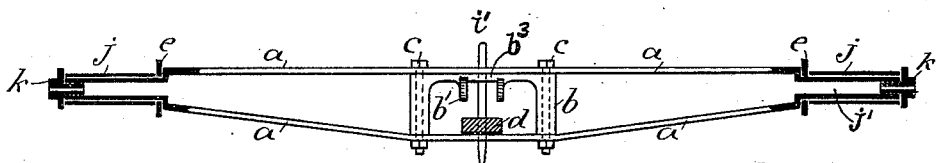
Figure 2:
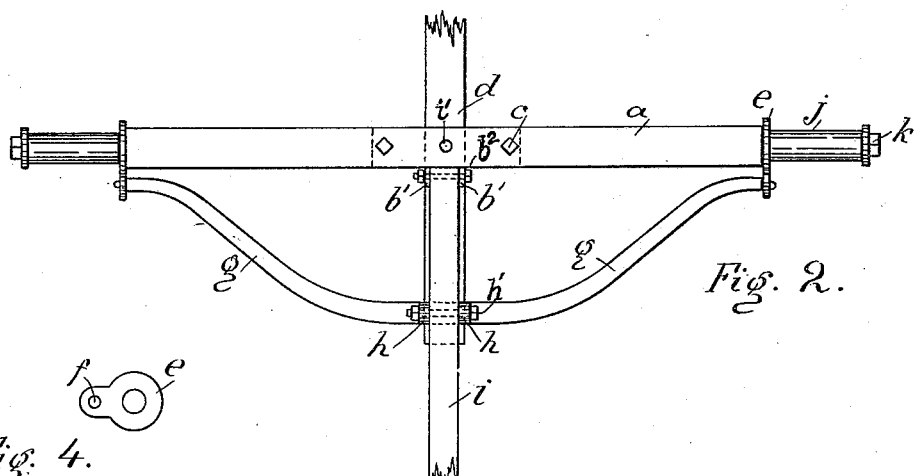
Figure 4:
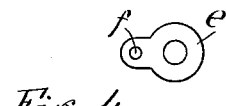
Figure 3:
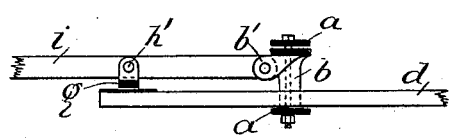
Figure 5:
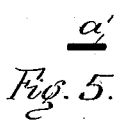
Figure 6:
Figure 7:
Figure 8:
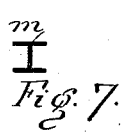
Figure 9:
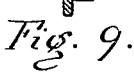
Figure 10:
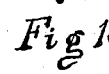

Figure 1 shows a fore axle of my improved running-gear for wagons in front view, partly in section. Fig. 2 shows a fore axle in plan view as seen from the top with a part of a reach and part of a tongue. Fig. 3 shows a transverse section of my fore axle taken near its center, showing parts of the reach and tongue. Fig. 4 shows a flange $e$ in end view. Figs. 5, 6, 7, 8, and 10 show transverse sections of different forms of members $a$ of my new axle. Fig. 9 shows a central longitudinal section of a wheel-nut on an enlarged scale.

Like letters of reference denote like parts.

My improvement in the construction of wagons relates particularly to those used on farms and roads and heavy vehicles of that character, and not at all to buggies and carriages and vehicles along said lines, wherein the item of light or heavy draft and convenience of loading and unloading is of no importance. I disclaim all pretense of invention whatsoever to all such conveyances and confine myself strictly to heavy draft and load vehicles to which my invention is applied solely as has never hitherto been attempted, a fact well known in the art, and is an achievement which is both new and valuable, as I have proved through many and expensive experiments, upon which an important business has been established, because the results of the experiments proved to be eminently practical and advantageous.

The object of my invention is to provide a trussed wagon-axle formed of two pieces, whereof the ends are welded into solid arms, the upper truss member horizontally straight and near the axes-line of the arms and the lower truss member more distant from said axis-line and curved or bowed downward, whereby the wagon-bed is brought nearer to the ground and thus the manual labor of loading diminished in proportion to said reduced height without reducing the diameter of the wheels, to also dispense with the hounds and their attachments, and to attach and support the tongue in a better way, and other minor improvements, as hereinafter set forth.

To attain said desirable ends I construct my said improved wagon-gear in substantially the following manner, namely:

My axles are formed of steel members $a\ a$ welded at their ends into arms $J'$, either solid or tubular, as shown in Fig. 1. Said arm may be finished for the wheel direct, but otherwise I shrink a thin steel sleeve $J$ thereon and a flange $e$, either integral therewith at the shoulder, as indicated in Fig. 2, or as a separate piece, as shown in Figs. 1 and 4. Said flange has an ear projecting forward in its plane provided with an eye $f$. Into said eye or eyes fit the ends of a semicircular or bow-shaped tongue-brace $g$, provided with upward-projecting lugs $h$ on each side of its center, between which is held the tongue $i$, through which and the lugs passes a bolt $h'$. Hollow posts $b$ connected by a cross-piece $b^3$ pass bolts $c$, connecting said parts and the members $a$. On each side of the center of the part $b^3$ are lugs $b'$ to receive the rear end of the tongue $i$, and through the lugs and tongue passes a bolt $b^2$. The tongue and brace are thus hinged to play up and down. The reach $d$ is carried on the lower truss member $a$ and projects forward under the brace $g$, said parts thus together forming a tongue-support. The king-bolt $i'$ holds the reach in the usual way and the posts $b'$ are wide enough apart to give ample play-room in turning.

In Figs. 5, 6, 7, 8, and 10, $a'$ shows one form of cross-section of the truss member $a$, and $l$, $m$, $n$, and $o$ show still other available and desirable forms to be used as circumstances may require. The wheel-nut $k$ has a threaded nipple for a tubular arm interiorly threaded. It has the obvious advantage of being more secure, less liable to be injured by grit and sand, and the thread may be made any desired length.

When the sleeve $J$ is worn it may be removed and replaced by a new one, and thus, with a slight repair, this part of the axle may be made as good as new.

What I claim is—

1. The combination with an axle formed of two truss-members, one above the other and a reach between and carried on said lower member and projecting forward from the axle, of a tongue carried on said reach, substantially as specified.

2. The combination with an axle provided at its arm-shoulders with flanges, each with ear and eye, a tongue, and lugs on each side of the king-bolt of a bolt through rear end of tongue and a tongue-brace with ends in said eyes, substantially as specified.

JAMES McCALLUM.

Witnesses:
WM. ZIMMERMAN,
EDMUND GALLANNER.